Dec. 11, 1923.
L. F. STAFFORD
BUMPER
Filed Jan. 22, 1923
1,477,155
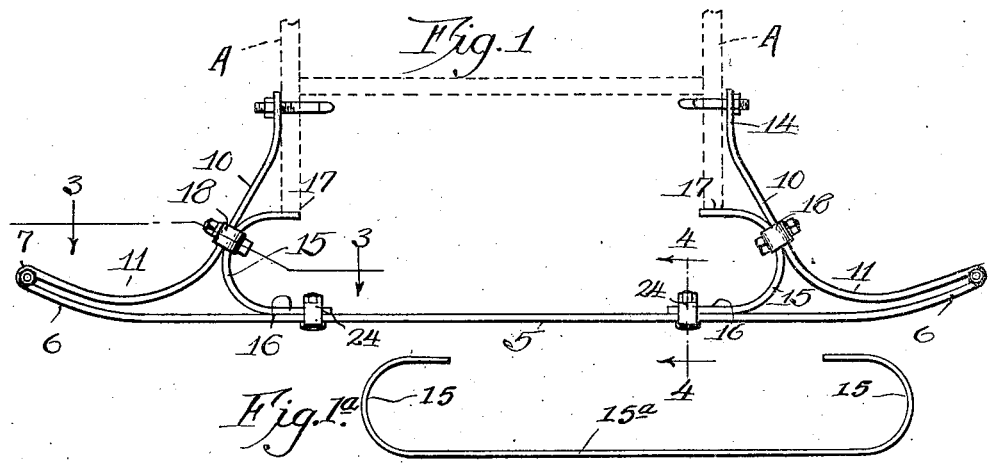
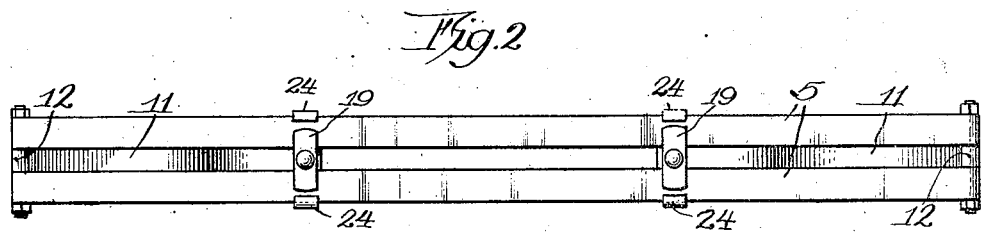
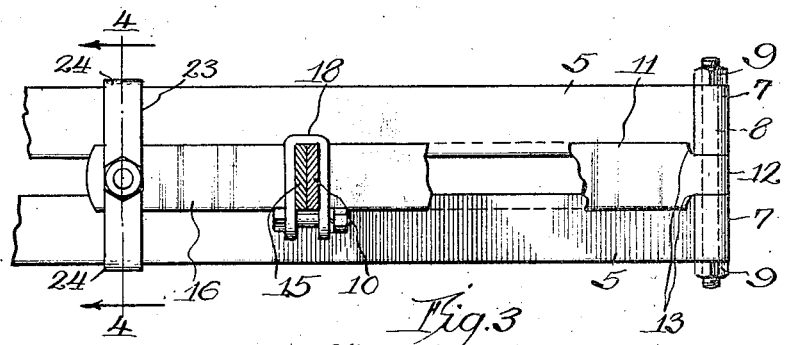
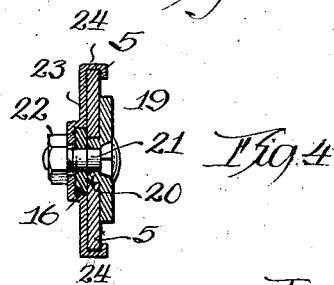
Witness:
Chas. R. Koursh.
Inventor,
Lewis F. Stafford,
Benjamin, Roadhouse & Lundy, Attys Patented Dec. 11, 1923.                                        1,477,155

UNITED STATES PATENT OFFICE.

LEWIS F. STAFFORD, OF CHICAGO, ILLINOIS, ASSIGNOR TO STAFFORD SALES COMPANY, OF CHICAGO, ILLINOIS, A CORPORATION OF ILLINOIS.

BUMPER.

Application filed January 22, 1923. Serial No. 614,094.

*To all whom it may concern:*

Be it known that I, LEWIS F. STAFFORD, a citizen of the United States, residing at Chicago, in the county of Cook and State of Illinois, have invented a new and useful Improvement in a Bumper, of which the following is a specification.

My invention relates to bumpers for motor vehicles, and more particularly to a double bar bumper in which the impact member comprises a plurality of horizontally disposed bars of metal arranged in vertical planes with their adjacent edges spaced a slight distance apart, whereby a wide impact structure is provided throughout the entire width of the vehicle.

One of the objects of my invention resides in the provision of a bumper of this character wherein an attaching arm is articulated or hingedly connected to the portions of the impact member so that they may be swung a slight distance upon their pivots and thereby increase or decrease the distance between the opposite ends of the arms to provide for adjustment of the structure to accommodate it to different widths of vehicles. Also, it is an object of my invention to provide supplementary supporting means for the double impact bars and for the attaching arms that may be slid longitudinally upon the impact bars when the main supporting arms are swung, which latter may be moved relatively to the supplementary arms by loosening the connecting clips, which permits of the adjustment just referred to. Other objects will be obvious to persons skilled in this art after an understanding of my invention is had. I prefer to carry out my invention in substantially the following manner, reference being had to the accompanying drawings that form a part hereof.

In the drawings:

Fig. 1 is a top plan of my improved bumper attached to the vehicle, the end of the latter being shown in dotted lines.

Fig. 1ª is a top plan of a modified supplementary supporting structure.

Fig. 2 is a vertical front elevation thereof.

Fig. 3 is a fragmentary view at one end of the bumper, the attaching elements being in section on line 3—3, Fig. 1 and slightly enlarged.

Fig. 4 is a transverse vertical section on line 4—4, Fig. 3.

It will be understood the impact receiving member of my bumper may be either a rigid bar or a spring bar, but for convenience I will describe the same as made of the latter. The bumper structure, as shown in the drawings, preferably comprises an impact member consisting of strips or ribbons of strap metal 5 that extend horizontally across the end of the vehicle, preferably to a point beyond the wheels so as to afford protection for the fenders and lamps at the front of the vehicle, and when used at the rear of the vehicle will protect the tires, brackets, fenders and fuel tank usually at this location. These bars are disposed with their wide portions facing outwardly from the vehicle and their adjacent edges slightly spaced apart. The central portions of bars 5 are substantially straight, and the end portions are bent or curved obliquely, as at 6 in the drawings. The ends of bars 5 are formed into cylindrical eyes having vertical axes, as seen in detail in Fig. 3, and arranged in axial alinement with each other through which a bolt 8 passes, and which is threaded upon opposite ends to receive the holding nuts 9. The impact bars are disposed in spaced positions and maintained in desired relation to each other by devices which will hereinafter be more fully described.

The arms 10 for attaching the impact bars to the vehicle frame comprise strips or ribbons of strap metal of substantially the same transverse dimensions as those of the impact bars, and are provided with outwardly extending lateral bends 11 and terminate in eyes 12. Prior to forming eyes 12, the metal of arms 10 is reduced in width, as seen at 13 in Fig. 3, so that the eyes correspond in vertical dimensions with the space between the end portions of impact bars 5 so that the eyes may be fitted between spaced eyes 7 of the impact bars and permit bolt 8 to pass therethrough so as to provide a hinged or articulated connection between the impact bars and attaching arms 10. The opposite ends 14 of arms 10 are deflected slightly and are secured to the sills A of the vehicle chassis in any well known manner.

In order to provide attaching support for arms 10 and the impact bars, I have provided the supplementary structures, shown in plan in Fig. 1, which comprise pieces of strap metal of substanitally the same gage as the other portions of the bumper; said pieces being bent to a U-shape, as shown; the connecting portions 15 being of substantially semi-circular curvature; one arm 16 being substantially straight and lying against the back portions of the spaced impact bars and overlying the space between the same. The other arms 17 of the supplementary pieces are secured to the vehicle sills A at points beyond and separate from the location of the attaching means for the main supporting arms 10. The curved portions 15 of the supplementary pieces contact the adjacent portion of mounting arms 10 and are secured thereto by means of clips 18. It will be understood, however, that the supplementary supports 15 for the impact member and arms 10 may be connected by an integral piece, 15ª, as illustrated in Fig. 1ª in which event the portion 15ª will conform to the shape of the rear or back surfaces of impact bars 5.

Besides the spacing of the impact bars by means of eyes 12 on the mounting arms, I provide spacers intermediate the ends of the impact bars which comprise flat plates 19 disposed upon the front of the impact bars, each provided with an embossment 20 upon its rear face that extends between the adjacent edges of impact bars 5 so that they will rest against and engage the same. The embossment and plate are centrally apertured to receive a flat headed bolt 21, and the shank of said bolt passes through an aperture, made in member 16 of the supplementary attaching structure. A nut 22 and suitable clip plate 23 are mounted upon the extended threaded end of bolt 21, and the nut screwed thereon to clamp the parts together. By loosening spacing elements 19 and clips 18 the relative positions of attaching arms 10 and supplementary supports 15 may be changed so as to fit vehicle chassis frames of different constructions and dimensions, and upon being so adjusted the clips and spacer are, respectively, clamped together to lock the parts in their adjusted positions.

The clip plate 23 above mentioned is preferably a strip of thin metal or a casting that is shaped to conform to the contour of the portions of the bumper back of spaced plates 19 and has its opposite ends provided with L-shaped extensions that pass over the top and bottom edges and extend transversely upon the front face of the impact members, as seen in Fig. 4 of the drawings, so as to prevent any lateral separation of bars 5.

What I claim is:—

1. A bumper comprising an impact member formed of a plurality of vertically spaced impact bars having their end portions bent obliquely and formed into tubular eyes, a supporting structure for each end of said impact member; each structure consisting of an arm of flat metal adapted at one end to be secured to the vehicle and curved outwardly and laterally towards its opposite end; said outer end being formed into an eye interposed between the eyes at the ends of the impact bars, a pin co-operating with all of said eyes to permit of an articulative movement between said supporting arm and the impact bars, and a supplementary arm coacting with said first arm and said impact member and secured to the vehicle at a point spaced from the point of attachment of said first arm.

2. A bumper comprising an impact member formed of a plurality of vertically spaced flat metal strips, supporting arms connecting the end portions of said impact member to a vehicle; said arms consisting of flat metal strips bowed outwardly from the vehicle and hingedly connected to the impact member, and supplementary supporting means coacting with said impact member and said arms and secured to the vehicle independent of said arms.

3. A bumper for motor vehicles comprising an impact member, means for securing said member to a vehicle having hinged connection with the impact member at the ends thereof, and means extending to the vehicle and secured thereto at points spaced from the points of attachment of the first named means and providing supplementary support for the impact member.

4. A bumper for motor vehicles comprising an impact member, arms extended rearwardly therefrom and adapted to be attached to the vehicle; said arms having hinged connection with the ends of the impact member, and supplementary supporting arms suitably connected to the aforesaid structure and connected to the vehicle at points spaced from the points of attachment of the first named arms.

5. A bumper for motor vehicles comprising an impact member formed of spring strap metal, arms hingedly connected to the ends of said impact member and extending laterally therefrom for attachment to the vehicle, and supplementary arms of spring strap metal connected to the impact member and said first named arms and secured to the vehicle independent of said first arms.

6. A bumper for motor vehicles comprising an impact member with arms hingedly connected to its ends that extend inwardly and then laterally therefrom for attachment to the vehicle, and supplementary arms extending from and having attachment directly between the impact member and a portion of the vehicle between and forward of the points of attachment of the first named arms; said supplementary arms formed of strap metal disposed upon edge whereby a cantilever support is provided for maintaining the bumper in position.

7. A bumper for motor vehicles comprising an impact member formed of a plurality of vertically spaced strips of strap metal, arms hingedly connected to the ends of said impact member and extending laterally therefrom for attachment to the vehicle, and supplementary arms of spring strap metal connected to the impact member and said first named arms and secured to the vehicle independent of said first arms.

8. A bumper for motor vehicles comprising an impact member formed of a plurality of vertically spaced flat metal strips, arms extended laterally therefrom and adapted to be attached to the vehicle; said arms having hinged connection with the impact member between the ends of the metal strips, and supplementary supporting arms suitably connected to the aforesaid structure and connected to the vehicle at points spaced from the points of attachment of the first-named arms.

9. A bumper for motor vehicles comprising a plurality of horizontally disposed vertically spaced strips of flat metal providing a relatively wide impact member, strap metal arms hingedly connected to the ends of the impact member and extended inwardly and then laterally therefrom for attachment to the vehicle, and supplementary arms extending from and having attachment directly between the impact member and a portion of the vehicle between and forward of the points of attachment of the first-named arms; said supplementary arms formed of strap metal disposed upon edge whereby a cantilever support is provided for maintaining the bumper in position.

10. A bumper for motor vehicles comprising an impact member, arms connected to the impact member intermediate its ends and formed with spring bends for attachment to a forward portion of the vehicle, and separate arms hingedly connected to the ends of the impact member and extending inwardly and laterally toward said firsting named arms and the vehicle whereby said arms may be moved in horizontal planes for attachment to different widths of vehicles without disturbing the relative position of the impact member.

11. A bumper comprising an impact member formed of a spring bar, and means for attaching the end portions of the same to a vehicle, each consisting of spring bars vertically disposed and arranged side by side a portion of their length; the outer end of said bars formed in a curve from an end of the impact bar to the vehicle and the inner bar formed in a relatively shorter curve from an intermediate portion of the impact bar to the vehicle at a point in front of the corresponding end of the other bar.

Signed at Chicago, county of Cook, and State of Illinois, this tenth day of January, 1923.

LEWIS F. STAFFORD.